Patented June 27, 1939

2,163,612

UNITED STATES PATENT OFFICE 2,163,612

METHOD OF PREPARING AN ADHESIVE

Alexander D. Macdonald, Malden, Mass., assignor to B. B. Chemical Co., Boston, Mass., a corporation of Massachusetts No Drawing. Original application November 22, 1935, Serial No. 51,114. Divided and this application April 23, 1937, Serial No. 138,631

3 Claims. (Cl. 260—89)

This invention relates to a method of preparing liquid adhesive compositions embodying plastic polymerized chloroprene and more particularly to such adhesives advantageous for securing together leather and shoe parts.

Plastic polymerized chloroprene is chloroprene (also known as chloro-2-butadiene-1,3) which has been partially polymerized, and is plastic in the sense that it may be worked on the rolls of a rubber mill and compounded with other ingredients in a manner similar to that in which crude rubber is treated. Such plastic polymerized chloroprene may be "cured" or "vulcanized" to a condition in which it is elastic rather than plastic, and in which condition it resembles vulcanized rubber. This "curing" is probably a further polymerization of the partially polymerized chloroprene to a substantially fully polymerized condition rather than the addition of sulphur to the polymer, such as is considered to occur in the vulcanization of rubber.

This is a division of my copending application, Serial No. 51,114, filed November 22, 1935, wherein is disclosed a liquid adhesive composition embodying plastic polymerized chloroprene dispersed or colloidally dissolved in an organic solvent and containing also compounding and curing ingredients.

In order to obtain optimum results in brushing such liquid adhesive by hand on leather or other material, I have found that the viscosity of the liquid adhesive solution should be within the range of from 15 to 25 seconds, and preferably from 17 to 22 seconds. Where the adhesive is to be applied by extrusion or other mechanical means, the viscosity of the adhesive may be higher, and up to, for example, 50 seconds. While the viscosity might be expressed in other units, the viscosity is referred to herein in terms of the number of seconds required for a steel ball of 9.5 millimeters (⅜ inch) diameter and weighing from 3.45 to 3.55 grams to drop 40 centimeters through a sample of the liquid adhesive maintained at 25° C. in a glass tube of 19 millimeters inside diameter.

Due to variability in the constituent materials of the composition, mode of preparation of the composition, and the like, it sometimes happens that the viscosity of the solution is higher than the above-indicated range. The viscosity may, of course, be lowered by the addition of a relatively large amount of solvent but in such case the concentration of plastic polymer is appreciably lowered, which in many instances is undesirable.

In view of the above considerations, an object of the invention is to provide an improved method of adjusting the viscosity of a liquid adhesive composition embodying the plastic polymerized chloroprene. Another object is to provide a method of reducing the viscosity of such a composition without substantially changing a ratio of solids content to solvent.

In the pursuance of the above and other objects I have found that the viscosity of a plastic polymerized chloroprene liquid composition may be regulated and reduced without substantially affecting the ratio of solids to solvent by adding to the composition a small quantity of an alcohol. Thus, for example, a cement having a composition similar to that in the specific example given hereinafter and having a viscosity of about 30 seconds may be reduced in viscosity to about 20 seconds by the addition of about 30 cubic centimeters of ethyl alcohol to a liter of cement, a reduction in viscosity quite disproportionate to the quantity of alcohol added.

The addition of the alcohol not only effects a reduction in the viscosity of the adhesive but also imparts thereto a smooth and free-flowing characteristic whereby the cement may be more readily spread over a surface to which it is to be applied. In another aspect, therefore, the invention contemplates the production of a plastic polymerized chloroprene liquid adhesive of improved flowing and spreading properties.

I have found to be efficacious for the purpose of this invention methyl alcohol, ethyl alcohol, iso-proyl alcohol and butyl alcohol, all of which are monohydroxy alcohols; glycerine, which is a polyhydroxy alcohol; diacetone alcohol, which is a ketoxy alcohol; butyl carbitol, butyl cellosolve, diethylene glycol, and methyl cellosolve, all of which are alkoxy alcohols. I have further found that meta cresol, beta naphthol, resorcinol and phenol function in a manner similar to that of the alcohols mentioned above with respect to their viscosity reducing effect in the adhesive composition. Hence, in the specification and claims the term "alcohol" is used in a generic sense to include all of the above-designated compounds. Of the above and other equivalent compositions, ethyl alcohol is at present the preferred alcohol for use in producing the desired viscosity-reducing effect in the adhesive composition.

In reducing the viscosity of the liquid adhesive by means of an alcohol, for example ethyl alcohol, the alcohol may, if desired, be added directly to the composition, provided that such direct addition be made carefully and in small increments so as not to produce local coagulation of the plastic polymer of chloroprene. However, in order to prevent any possible local coagulation of the plastic polymer and to make it unnecessary to add the alcohol in small increments, it is preferred to add the alcohol mixed with one or more of the solvents employed in the composition, namely, benzene or trichloroethylene. Thus, a mixture of equal volumes of alcohol and benzene or trichloroethylene may be added more freely to the liquid adhesive to produce the desired reduction in viscosity and without danger of local coagulation of the dissolved material. This latter feature is of particular interest where the ratio of solids to solvent is such that the incorporation of additional solvent is feasible or desirable, the result being a reduction in viscosity far greater than would be accomplished by the addition of the solvent alone or than would be expected by the addition of a mere diluent.

An example of a composition in connection with which this invention may be practised is as follows:

| | Grams |
|---|---|
| Plastic polymerized chloroprene (containing 2% pheneyl-beta-naphthylamine) | 900 |
| Wood rosin (FF) | 45 |
| Magnesium oxide (light calcined) | 90 |
| Zinc oxide | 45 |
| Phenyl-beta-naphthylamine (stabilizer) | 9 |
| Benzene | 1690 |
| Trichloroethylene | 2850 |
| Sulphur | 27 |
| Du Pont Accelerator #808 (butyraldehyde aniline condensation product) | 12 |

It is to be noted that in this example the benzene and the trichloroethylene are present in equal quantities by volume.

In preparing the above composition, the plastic polymer is milled on a rubber mill and the wood rosin, magnesium oxide and zinc oxide are added during the milling, preferably in that order. The resultant milled solid polymer is then cut up into small pieces and is added in a churn to a mixture of the benzene and trichloroethylene. The phenyl-beta-naphthylamine is also added in the churn. When the resulting solution of the milled material in the solvent has become sufficiently viscous to support the sulphur in suspension during the agitation of the solution, the sulphur is introduced into the solution and the agitation thereof is continued until the sulphur has been dispersed or dissolved.

The accelerator preferably is added not more than 24 hours prior to the actual use of the liquid solution for adhesive purposes. It is convenient to withhold a portion of the solvent and to dissolve the accelerator therein, and then to add the accelerator solution to the composition.

In the above composition the plastic polymerized chloroprene is of course the adhesive material. The wood rosin is a softener for the plastic polymer of chloroprene and it assists also in the curing of the polymer. Abietic acid, which is the major constituent of wood rosin, may be substituted for all or a part of the wood rosin. The magnesium oxide serves to neutralize any hydrochloric acid which may be set free in the polymerized chloroprene, and to prevent scorching when the zinc oxide and plastic polymer of chloroprene are milled together. Light calcined magnesium oxide is preferred because of the generally better results to be obtained therewith. The zinc oxide appears to assist in the curing or more complete polymerization of the plastic polymer of chloroprene. The phenyl-beta-naphthylamine functions as a stabilizer to inhibit premature curing of the polymer. The sulphur assists in the curing or vulcanization of the plastic polymer and appears to contribute to improved properties of the resulting adhesive bond. The accelerator serves to initiate the rapid curing or completion of the polymerization of the plastic polymer at temperatures in the neighborhood of room temperature, and thus making unnecessary heating the parts to be joined, for example shoe parts, to high vulcanizing temperatures. In cases where rapid curing of the polymer is not necessary or desirable, or where it is feasible to employ heat to bring about the cure, the accelerator may be omitted.

While the volume ratio of benzene and trichloroethylene is preferably 1:1, said ratio may satisfactorily vary from 1:2 to 2:1. The concentration of plastic polymerized chloroprene may be varied from about 1½ to about 2¼ pounds of plastic polymer to the gallon of solvent. A composition wherein the concentration of plastic polymerized chloroprene varied from about 1½ to 2¼ pounds of plastic polymer per gallon of solvent and wherein the solvent blend ratio of benzene and trichloroethylene ranged from 1:2 to 2:1 by volume, would comprise in parts by weight, 1 part of plastic polymerized chloroprene, 1 to 3 parts by weight of benzene, and 5½ to 2 parts of trichloroethylene, or, in terms of total solvent, 1 part plastic polymer and 4 to 7 parts of solvent blend.

The incorporation of the alcohol into the composition for the purposes of this invention may be carried out by adding the alcohol directly to the composition. In such case the alcohol should be added carefully and in small increments so as not to produce local coagulation of the plastic polymer of chloroprene. Where the addition of more solvent is feasible the alcohol may be mixed with the solvent and then added to the composition. Thus, in the composition given above a mixture of equal volumes of alcohol and benzene or trichloroethylene may be added more freely than alcohol alone to produce the desired reduction in viscosity and without danger of local coagulation of the dissolved or dispersed material. It will be understood, of course, that the reduction of viscosity of the liquid adhesive by means of an alcohol is not limited to compositions embodying benzene and trichloroethylene but may be employed with other solvents for plastic polymerized chloroprene.

In preparing a liquid cement of predetermined viscosity from plastic polymerized chloroprene and compounding ingredients, the polymer together with the compounding ingredients may be dissolved or dispersed in an amount of solvent less than sufficent to impart the desired viscosity to the resulting solution. The solution may then be brought down to the desired viscosity without any coagulation of dissolved or dispersed ingredients by adding a mixture of an alcohol and a solvent for the polymer. The solid content of the resulting composition is higher than would be the case if the viscosity had been reduced with solvent alone, with the attendant advantage that when the composition is employed for adhesive purposes, a larger quantity of solids may be deposited from a given volume of liquid adhesive composition. Moreover, the presence of the alcohol imparts smooth and free-flowing characteristics to the composition whereby it may be more readily spread over a surface to which it is to be applied.

In carrying out the adhesion of leather or shoe parts by means of the liquid adhesive composition of this invention, the leather parts are preferably first roughed in a suitable manner, such as by an emery wheel or a wire brush, in order to provide surfaces most advantageous for cementing. The liquid adhesive is then applied, preferably to both surfaces to be united. The application of the adhesive may be by brush, by extrusion, or in any other suitable manner. The applied composition is then permitted to dry for a sufficient length of time to remove a major portion of the solvent. At the time of the application of the adhesive to the leather the leather may be water-moistened, or, as known in the art, in temper. However, where conditions permit, it is desirable, though not necessary, to have the leather in an air-dry condition. Ordinarily a drying time of not more than about one hour is necessary before the adhesive coated parts may be brought together under attaching pressure. On the other hand, the adhesive may be permitted to dry for as much as 8 hours before bringing the adhesive coated parts together without seriously affecting the strength of bond. After a suitable drying period as described above, the parts are brought together under attaching pressure, either momentarily or for a longer period. By way of example, in the adhesive attaching of shoe parts an attaching pressure of 80 pounds per square inch has been found satisfactory. Lower attaching pressures may be employed but preferably a relatively high attaching pressure is used.

Having described my invention, what I claim as new and desire to secure by Letters Patent of the United States is:

1. The method of preparing a liquid vulcanizable cement from plastic polymerized chloroprene and compounding ingredients and having a viscosity such that it may be readily spread over a surface to which it is to be applied which comprises dissolving the polymer together with the compounding ingredients in an amount of solvent less than sufficient to impart the desired viscosity to the resulting solution and adding to the solution a mixture of a solvent for said polymer and an "alcohol", thereby substantially reducing the viscosity of the solution without any coagulation of the dissolved ingredient.

2. The method of preparing a liquid vulcanizable cement from plastic polymerized chloroprene and compounding ingredients and having a viscosity such that it may be readily spread over a surface to which it is to be applied which comprises dissolving the polymer together with the compounding ingredients in a solvent, and subsequently adding an "alcohol" thereto in small increments, thereby substantially reducing the viscosity of the solution without any coagulation of the dissolved ingredients.

3. The method of preparing a liquid vulcanizable cement from plastic polymerized chloroprene and compounding ingredients and having a viscosity such that it may be readily spread over a surface to which it is to be applied which comprises dissolving the polymer together with the compounding ingredients in an amount of solvent less than sufficient to impart the desired viscosity to the resulting solution and adding to the solution a mixture of a solvent for said polymer and ethyl alcohol, thereby substantially reducing the viscosity of the solution without any coagulation of the dissolved ingredients.

ALEXANDER D. MACDONALD.